Aug. 11, 1942.            C. CARSON            2,292,509
AUTOMATIC VALVE FOR LIQUID CONTAINERS
Filed Sept. 23, 1940        2 Sheets-Sheet 1
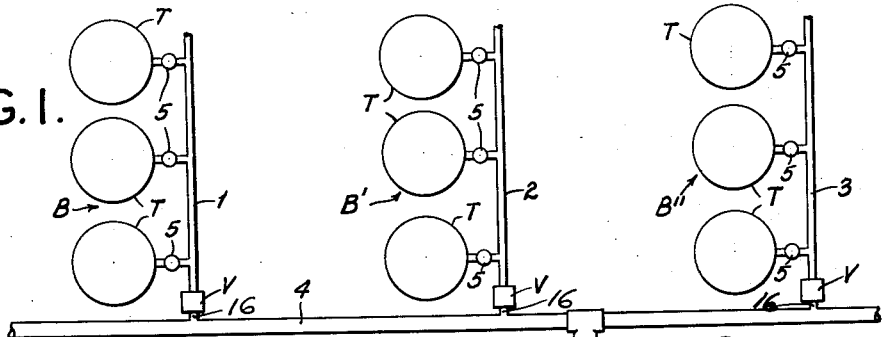
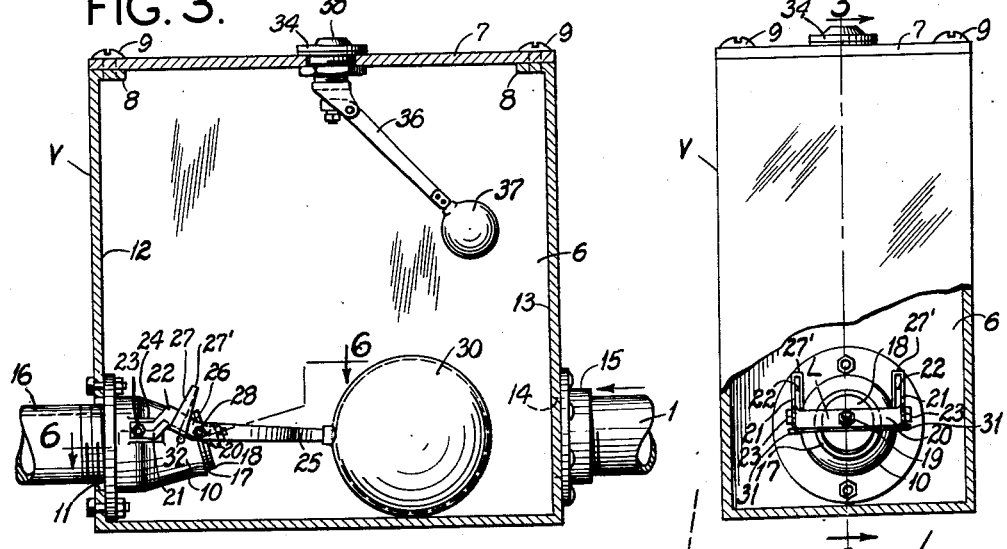
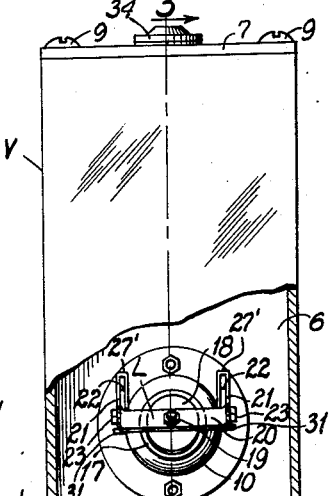
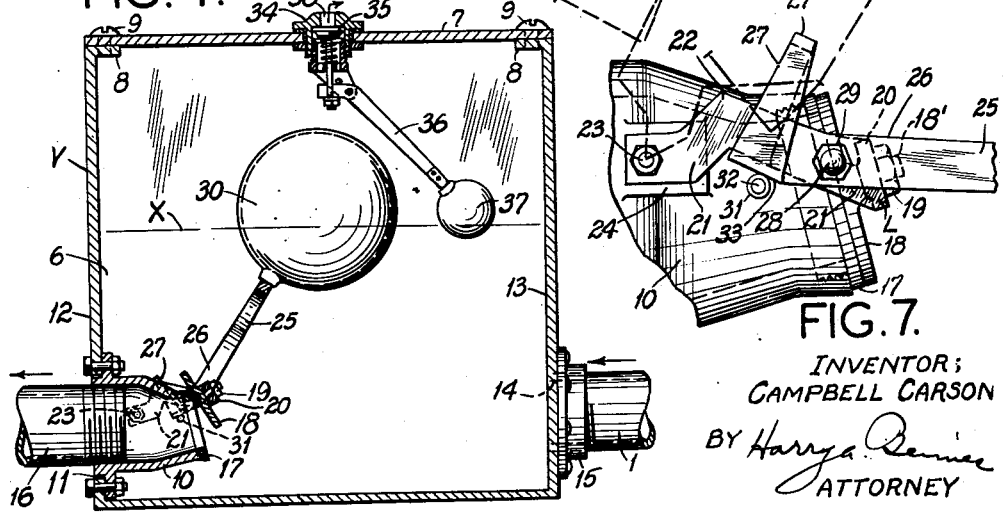
INVENTOR:
CAMPBELL CARSON
BY Harry A. Dennis
ATTORNEY Aug. 11, 1942.  C. CARSON  2,292,509
AUTOMATIC VALVE FOR LIQUID CONTAINERS
Filed Sept. 23, 1940  2 Sheets-Sheet 2

INVENTOR;
CAMPBELL CARSON
BY Harry P. Benner
ATTORNEY

Patented Aug. 11, 1942

2,292,509

UNITED STATES PATENT OFFICE 2,292,509

AUTOMATIC VALVE FOR LIQUID CONTAINERS

Campbell Carson, Brownstown, Ill.

Application September 23, 1940, Serial No. 357,937

3 Claims. (Cl. 137—68)

My invention has relation to improvements in automatic valves for oil storage tanks and it consists in the novel features of construction more fully set forth in the specification and pointed out in the claims.

The invention is primarily directed to a valve for automatically closing the feed line from oil storage tanks to the oil main into which a plurality of feed lines lead. It is a matter of common knowledge that in the oil fields there are batteries of storage tanks for temporarily receiving the oil from the wells which are periodically drained for shipment to the refinery. Where a number of such batteries lead to a common main, valves of the tanks of one battery should be closed while another battery is being drained in order to prevent sucking of air into the main and diminishing the oil flow. I have devised an automatic cut-off valve that may be disposed between each battery of tanks and the oil main so that when the tanks of any battery are drained the feed pipe from said tanks will be automatically shut off so as not to interfere with the drainage of the tanks of any one battery.

The essential features of my improved valve are that it shall be quick acting and positive and shall be controlled by the flow of oil itself to automatically open in response to the oil flow and automatically close when the oil flow ceases.

Figure 5:
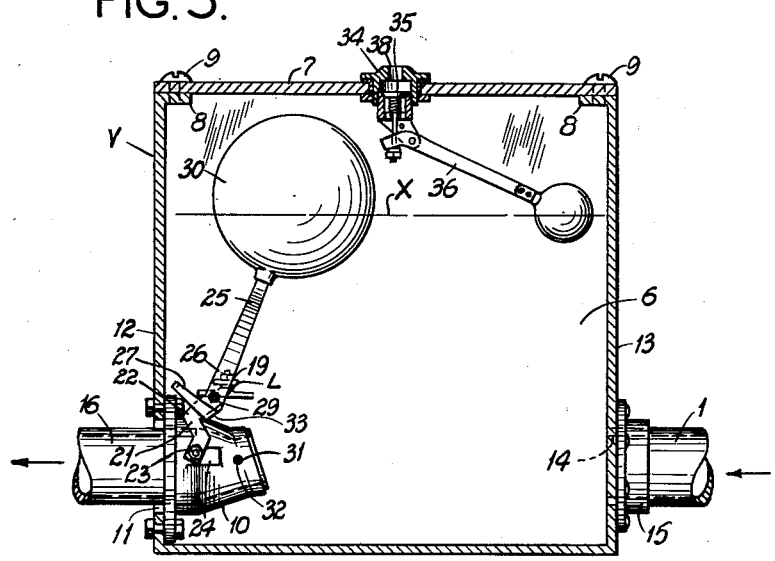
Figure 6:
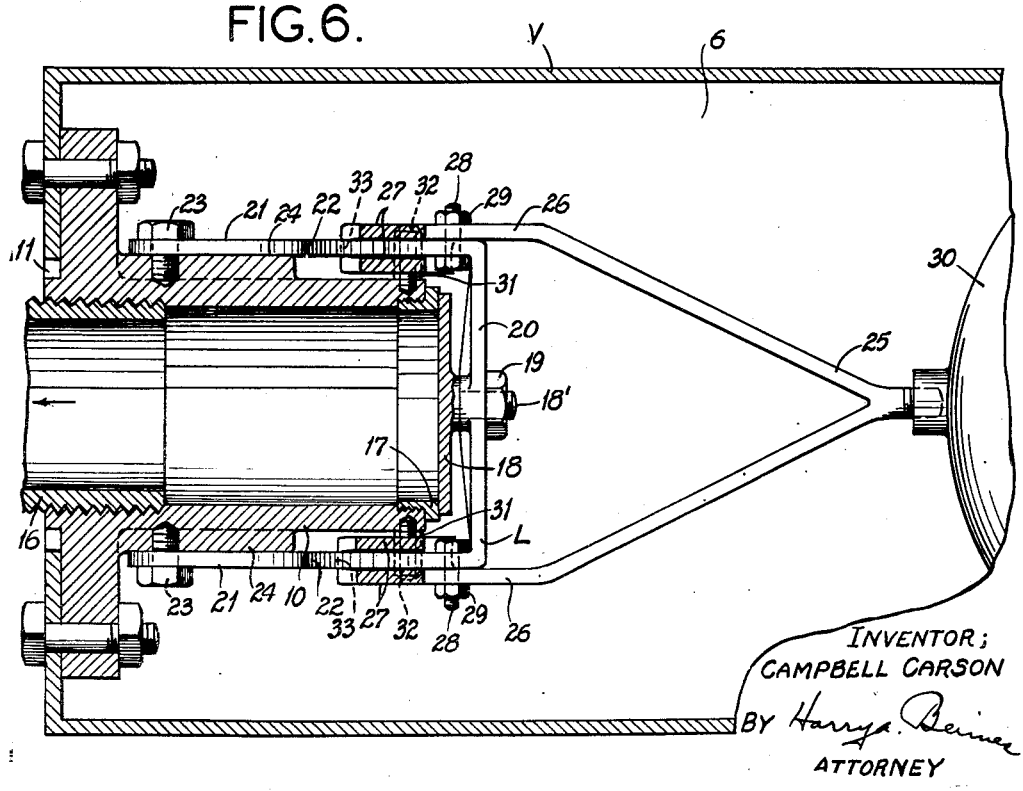

The advantages of the invention will be better apparent from a detailed description thereof in connection with the accompanying drawings, in which:

Figure 1 represents a diagrammatic view of a plurality of oil tank batteries connected to a common main; Fig. 2 is an end elevation of a box in which my automatic cut-off valve is disposed, parts thereof being broken away to show the valve in end elevation; Fig. 3 is a vertical longitudinal section taken on the line 3—3 of Fig. 2 with the valve shown in elevation and in its closed position; Fig. 4 is a section similar to that shown in Fig. 3 except that the valve is shown partially open and in section; Fig. 5 is a section similar to Fig. 3 with the valve shown in its uppermost position and fully open; Fig. 6 is a horizontal sectional detail through the valve mechanism taken on the line 6—6 of Fig. 3; and Fig. 7 is an enlarged fragmentary view of the valve mechanism showing open positions of the valve in dot and dash lines.

Referring to the drawings, B, B', B" represent a plurality of batteries of oil storage tanks T, the tanks of the respective batteries being connected by feed lines 1, 2 and 3 to the main 4. Each tank T is provided with an individual control valve 5 and between each of the feed lines 1, 2 and 3 and the main 4 is my automatic cut-off valve V.

My improved valve V comprises a box 6 having a removable top 7 secured to a flange 8 by screws 9, within which box 6 is a suitable fitting 10 secured over an opening 11 in end wall 12 of the box. On the opposite end wall 13 there is an opening 14 over which is secured a flange 15 into which is screwed one of the respective feed pipes 1, 2 or 3.

An outlet pipe 16 is screwed into the outlet side of fitting 10, while a valve seat 17 is screwed into the inlet side of said fitting. A disc valve 18 is arranged to seat on the valve seat 17, said disc valve being secured by a stud 18' and nut 19 to cross-member 20 of a U-shaped lever L, the side arms 21, 21 of which are V-shaped with the apex 22 of the V projecting upwardly. Each of the side arms 21, 21 is pivotally mounted near its extremity on a stud 23 screwed into a boss 24 on the side of fitting 10.

There is a second bifurcated lever 25, the arms 26, 26 of which terminate in upwardly projecting loops 27, 27 through which pass the side arms 21, 21 of lever L and to which the arms 26, 26 of lever 25 are pivotally connected by means of bolts 28, 28 held in place by nuts 29, 29. Thus the lever 25 is pivotally connected to lever L and movable relative thereto, and lever L is pivotally mounted on the fitting 10. The upper closed ends 27' of loops 27 are of a length so that when the lever 25 has been moved a substantial distance relative to lever L, the ends 27' of the loops will impinge on the apex 22 of lever arms 21 and carry said lever L upwardly with the lever 25 in any further movement thereof.

There is a hollow ball 30 secured to the free end of bifurcated lever 25, the weight of which holds the levers 25 and L in their lowermost position at which time the disc valve is on its seat 17 and the inner ends of lever arms 26, 26 rest on rollers 31, 31 mounted on studs 32, 32 projecting from the sides of fitting 10. Loops 27, 27 have bottom plates 33, 33 which bear on the rollers 31, 31 and rotate about said rollers as a fulcrum when the lever 25 is raised until such time as the closed ends 27', 27' of loops 27 impinge on apex 22 of the arms 21, 21 of lever L.

When any of the valves 5 are opened to permit oil to flow through feed pipe 1 and opening 14 into the box 6 the hollow ball 30 will act as a float and be raised by the rising level of oil in the box to carry levers 25 and L upwardly to unseat valve 18 until the fully open position, as indicated in Fig. 5, is reached. Of course while the oil level is rising within the box the air is permitted to escape therefrom through a vent valve 34, the valve disc 35 thereof being controlled by lever 36 and float 37 so as to close the vent opening 38 when the oil level X rises as indicated in Fig. 5.

By the arrangement of levers 25 and L considerable leverage is applied at the beginning of the opening of the valve 18 as shown in Fig. 7. An inspection of this figure will show that while lever 25 is moving about the rollers 27, 27 as a fulcrum through an angle in excess of 45 degrees, the lever L which carries the valve 18 will move through an angle of approximately 15 degrees. After the valve 18 is unseated the combined leverage effective on the valve 18 is considerably reduced so that the valve will open rapidly through the last movement of the float 30. Thus it will be seen that in order to open the valve 18 great pressure is applied thereto, while after the valve is opened rapid movement is imparted to it to get the valve in its fully opened position more rapidly.

Having described my invention, I claim:

1. In a valve arrangement for an oil tank, a suitable casing having a valve seat, a disk valve mounted for operation to and from said seat, a lever yoke carrying said disk valve, a second lever pivotally connected to the lever yoke and initially operating about a fixed fulcrum to unseat said valve means on said second lever for impingement on the lever yoke after the valve is unseated, and a float connected to the second lever.

2. In a valve arrangement for an oil tank, a suitable casing having a valve seat, a lever arrangement comprising a primary lever and a secondary lever having pivotal connection, stop members in spaced relation at the end of the primary lever for engagement with the secondary lever to limit the relative movement of said levers, said secondary lever having a disk valve on its free end, said primary lever having a float on its free end, and a fulcrum member engaging the primary lever at the end opposite the float whereby movement of the primary lever is effective on the secondary lever to unseat the valve.

3. A valve arrangement comprising a casing having a valve seat, a lever of the third class pivotally connected thereto, a valve on the free end thereof movable to and from said seat, a lever of the second class pivotally connected to the lever of the third class, a float on the free end of the lever of the second class, a fixed fulcrum on the casing for initially supporting the lever of the second class, and means for coupling said levers together whereupon they act jointly as a lever of the second class about the pivotal connection of the first mentioned lever.

CAMPBELL CARSON.